(12) United States Patent
Shinno

(10) Patent No.: US 7,099,923 B2
(45) Date of Patent: Aug. 29, 2006

(54) DATA STORAGE SYSTEM

(75) Inventor: Kazuyuki Shinno, Zama (JP)

(73) Assignee: Computer Engineering & Consulting Ltd., Kanagawa (JP)

( * ) Notice: Subject to any disclaimer, the term of this patent is extended or adjusted under 35 U.S.C. 154(b) by 486 days.

(21) Appl. No.: 09/998,995

(22) Filed: Oct. 31, 2001

(65) Prior Publication Data

US 2002/0059444 A1 May 16, 2002

(30) Foreign Application Priority Data

Nov. 1, 2000 (JP) ............... 2000-334297
Oct. 29, 2001 (JP) ............... 2001-330224

(51) Int. Cl.
*G06F 15/163* (2006.01)
(52) U.S. Cl. .................... 709/213; 717/146
(58) Field of Classification Search ........ 709/213–218; 382/282; 379/133; 345/748; 717/146; 705/400
See application file for complete search history.

(56) References Cited

U.S. PATENT DOCUMENTS

| | | | | |
|---|---|---|---|---|
| 5,809,078 A | * | 9/1998 | Tani et al. ............... | 375/259 |
| 5,920,893 A | * | 7/1999 | Nakayama et al. ....... | 711/147 |
| 6,041,386 A | * | 3/2000 | Bello ...................... | 711/4 |
| 6,173,407 B1 | * | 1/2001 | Yoon et al. ............. | 713/201 |
| 6,199,054 B1 | * | 3/2001 | Khan et al. ............. | 705/400 |
| 6,304,940 B1 | * | 10/2001 | Beardsley .............. | 711/112 |
| 6,370,687 B1 | * | 4/2002 | Shimura ................. | 717/146 |
| 6,744,782 B1 | * | 6/2004 | Itakura et al. .......... | 370/466 |
| 2001/0028363 A1 | * | 10/2001 | Nomoto et al. ........ | 345/748 |
| 2002/0021669 A1 | * | 2/2002 | Kunito et al. .......... | 370/235 |
| 2002/0094070 A1 | * | 7/2002 | Mott et al. ............. | 379/133 |

FOREIGN PATENT DOCUMENTS

| | | |
|---|---|---|
| JP | 09-171490 | 6/1997 |
| JP | 09-269930 | 10/1997 |
| JP | 10-336229 | 12/1998 |
| JP | 11-110211 | 4/1999 |
| JP | 11-252161 | 9/1999 |

\* cited by examiner

*Primary Examiner*—Nasser Moazzami
(74) *Attorney, Agent, or Firm*—Norris McLaughlin & Marcus PA

(57) ABSTRACT

A data storage system including data sending/receiving nodes and a relay node, which is provided between the data sending/receiving nodes and a network, for relaying data between said data sending/receiving nodes and said network. The relay node has a meta-data memory for registering data processes which should be conducted in the relay node as meta-data, and a data processor for conducting data process in accordance with the processes defined by the meta-data registered in said meta-data registering memory. In the relay node, meta-data designated by said data sending/receiving node is selected from the meta-data registering memory, and data sent from said data sending/receiving node or data received by said data sending/receiving node is processed in accordance with the processes defined by the selected meta-data.

4 Claims, 4 Drawing Sheets

Fig. 2(a)

| Header | Name | Command | Meta-data Body |
|---|---|---|---|
| Header | Debit Note Conversion | Register | <DATA DEFINITION>::<br><Node 10 Debit Note>:=<'Debit Note'><Node 30··· |

Fig. 2(b)

Example for Data Conversion in Data Processing Ceter 20

<Node 10 Debit Note>:=<' Debit Note   ' ><Node 10 Debit Note Data> ;
<Node 10 Debit Note Data>:=<Node 10 Product Name Data><Node 10 Quantity Data> ;
                             <Node10 Unit Price Data><Node 10 Amount Data> ;
<Node 10 Product Name Data>:=<' Product Name : ' ><Name> ;
<Node 10 Quantity Data>:=<' Quantity : ' ><Quantity> ;
<Node 10 Quantuty Data>:=<' Unit Price : ' ><Unit Price> ;
<Node 10 Amount Data>:=<' Amount : ' ><Amount> ;
<Node 30 Debit Note>:=<' Debit Note ' ><Node 30  Debit Note Data> ;
<Node 30 Debit Note Data>:=<' Name   Quantity   Unit Price   Amount ' ><Node30 Item Data> ;
<Node 30 Item Data>:=<Name><Quantity><Unit Price><Amount><Node30 Item Data> |
                          <NULL> ;

Fig. 2(c)

Debit Note dealt in Node 10

| Debit Note | |
|---|---|
| Issued : | Date |
| Product Name : | XXXXX |
| Quantity : | XX |
| Unit Price : | XXX |
| Amount : | XXXXX |

Debit Note dealt in Node 30

Debit Note
Date

| Name | Quantity | Unit price | Amount |
|---|---|---|---|
|  |  |  |  |
|  |  |  |  |
|  |  |  |  |

Fig. 4

Example for Virus Check Process in Data Processing Center 20

<Node 10 Mail> : =<' *@XXX.co.jp' ><Mail Data> ;
Vaccine Program Name (<Mail Data>)

Fig. 5

Example for Back-up Process in Data Processing Center 20

<Node 10 Pass> : =<' ¥¥Node 10¥Node 10 Pass Name' > ;
<Node 10 Back-up Data> : =Read (<Node 10 Pass>) ;
Write File Name (<Node 10 Back-up Data>)

Fig. 3(a)

Example for Data Automatic Recording in Data Processing Center 20

<Purchase Image> : =<' xxxx/yyyy/purchase.htm' ><Purchase Data> ;
<Purchase Data> : =<Name><〒1><〒2><Address><Quantity><Credit Card Number> ;
Write File Name (<Name><〒1><〒2><Address><Quantity><Credit Card number>) ;

Fig. 3(b)

Product Purchase Image (xxxx/yyyy/purchase.htm)

DATA STORAGE SYSTEM

BACKGROUND OF THE INVENTION

1) Field of the Invention

The present invention relates to a data storage system, and particularly, relates to a data storage system where data processing required for data transmitted/received from/by data transmitting/receiving nodes belonging to the system or for data dealt in the transmitting/receiving nodes are conducted by a relaying node, which is positioned between the data transmitting/receiving nodes and a network.

2) Related Art Statement

According to the rapid spread of networks, many companies have started to attend to EC (Electronic Commerce) or EDI (Electronic Data Interchange). EC is a general term for all or a part of commercial transactions conducted on a network, and EDI means a system where commercial transactions, such as ordering/accepting and estimating, are conducted on a network.

However, data transmitting/receiving, which is conventionally conducted in EC or EDI, has problems mentioned below.

First, in EC or EDI, an exclusive data format is used for each trade circle; therefore, if the data format used in a company attending EC or EDI is different from the commonly used exclusive one, the company is required to change its data format to the exclusive format whenever sending/receiving data to/from EC or EDI.

In addition, in a conventional system, it is difficult to exchange data between companies belonging to different trade circles. That is to say, when a company wishes to transfer data to another company, which belongs to a different trade circle, it is required that the data transmitting company changes the data format so as to suit that used by the data receiving company; or both the data transmitting company and the data receiving company previously have an arrangement about the data format and change the data format in accordance with the arrangement; or the data receiving company converts the data format of the transmitted data into a readable data format. For this reason, the network business, particularly, EDI business is apt to be closed and limited to one trade circle only.

Second, in case that a great amount of data is transmitted to a number of companies in EC or EDI, it is troublesome for the data transmitting company to separately summarize and sum up the data in a condition required by each data receiving company.

Third, when a computer system is renewed in a company under the condition that a great deal of data is stored in the company, many steps are necessary to transfer the data stored in the old computer system into the new system and it is hard to transfer the data smoothly from the old system to the new system. Therefore, the data stored in the old system is hardly used in the new system.

The present invention has been created to solve the above-mentioned problems and has for its purpose to provide a data storage system where a data process center is provided between a network and data sending/receiving companies, so that data is transferred/received to/from the companies via the data processing center. According to the invention, since the difficult processes, such as data format conversion, data summarizing, totaling, and data storing, which has conventionally conducted by the companies themselves attending to EC or EDI, is achieved in the data processing center, the burden for processing data in the companies can be reduced.

SUMMARY OF THE INVENTION

In order to solve the above-mentioned task, the data storage system according to the invention comprising at least one data transmitting/receiving node and a data relay node being provided between said data transmitting/receiving node and a network so as to relay data transferred/received from/to the node to said network, wherein said data storage system node comprising a meta-data registering means for registering processes which should be conducted in the data relay node as meta-data and a data processing means for conducting data processes in accordance with the process defined by said meta-data requested in said meta-data registering means, wherein meta-data designated by said data transmitting/receiving node is selected from said meta-data registering means and data sent from said data sending/receiving node or data received by said data sending/receiving node are processed in accordance with the processes defined by the selected meta-data.

According to the present invention, once a given process is registered in the meta-data registering means in the data relay node, the data sending/receiving node can authorize the data relay node to conduct necessary processes when sending/receiving data by designating the relevant meta-data or doing it automatically.

Further, the data storage system according to the invention has an aspect in that said data relay node comprises a sending/recording data memory means for storing data sent/received by said data sending/receiving node via said relay node, wherein said meta-data registering means stores meta-data which defines the processes to automatically memorize data transferred/received from/by said data sending/receiving node in said sending/receiving data memory means, and wherein said data sent/received from/by said data sending/receiving node through said relay node is automatically stored in the sending/receiving data memory means in accordance with the processes defined by said meta-data.

According to this aspect, the data transferred/received from/by the data sending/receiving node through the system can be managed in the data relay node in a collective manner.

Furthermore, the data storage system according to the invention has another aspect in that meta-data defining processes for converting the data format of the data sent from said data sending/receiving node to a data format required by a destination of the data is registered in said meta-data registering means, and wherein when said data sending/receiving node sends data via said relay node, the data format of said data is converted to a format required by the destination in said relay node.

Furthermore, the data storage system according to the invention has another aspect in meta-data, which define processes for converting the data format of the data sent from an origin node to a data format used in said data sending/receiving node, are registered in said meta-data registering means, and wherein when said data sending/receiving node receives data via said relay node, the data format of said data is converted to the format of the data sending/receiving node in said relay node.

According to these aspects, the companies attending to EC or EDI (data transmitting/receiving nodes) can transmit data ignoring the format, or can receive data whose format has been converted to their form without taking any action to convert it at the company side.

Moreover, the data storage system according to the present invention has still another aspect in that meta-data, which define processes for conducting a virus check about data received by said data sending/receiving node, are registered in said meta-data registering means, and wherein data received by said data sending/receiving node is subjected to a virus check in accordance with the processes defined by the meta-data for virus checking in said relay node.

According to this aspect, the virus check for the data received by the data sending/receiving node can be conducted in the data relay node. Therefore, the data sending/receiving node does not need to own a vaccine software to find a virus program, so that the burden in the node can be reduced.

Moreover, the present invention has still another aspect in that meta-data, which define processes for backing up about data dealt in said data sending/receiving node, are registered in said meta-data registering means, and wherein data dealt in said data sending/receiving node are backed up in accordance with the processes defined by the meta-data for backing up in said relay node.

According to this aspect, the back up data for each data sending/receiving node can be kept in the relay node. Therefore, in case that the computer system in the data sending/receiving node is renewed, it becomes easy to transfer the data into the new computer system because the data itself is stored in the relay node.

Furthermore, the data storage system according to the present invention may further comprises a function for preventing irregular access to said data sending/receiving node, and/or, a function to split the load of communication lines between said relay node and said data sending/receiving node.

Furthermore, the data storage system according to the present invention may further comprises a function for preventing data leakage of data sent/received from/by said data sending/receiving node, a function for deleting unnecessary data included in data sent/received from/by said data sending/receiving node, and a function for obtaining a communication log of data sent/received from/by said data sending/receiving node, and wherein said relay node carries out one or more of the functions in accordance with a request from said data sending/receiving node.

According to this arrangement, the data sending/receiving node is able to obtain such a service easily.

Moreover, the data storage system according to the present invention has still another aspect in that the system further comprises a charge calculating means for calculating a charge using the data sending/receiving node; wherein said charge calculating means calculates the charge for using the system in accordance with how many times the data processing means in the relay node processed data and/or the type of the data processes which the data processing means is conducted.

It may be possible to arrange such that the charge calculating means calculate the charge in accordance with how much the data sending/receiving node used the computer resources provided in the relay node.

BRIEF EXPLANATION OF THE DRAWINGS

FIGS. 2(a) to 2(c) are schematic views depicting processes conducted in the first embodiment of the present invention.

FIGS. 3(a) to 3(b) are schematic views illustrating processes conducted in the second embodiment of the present invention.

FIG. 4 is a schematic view representing processes conducted in the third embodiment of the present invention.

FIG. 5 is a schematic view showing processes conducted in the fourth embodiment of the present invention.

DETAILED EXPLANATION OF THE PREFERRED EMBODIMENTS

Figure 1:
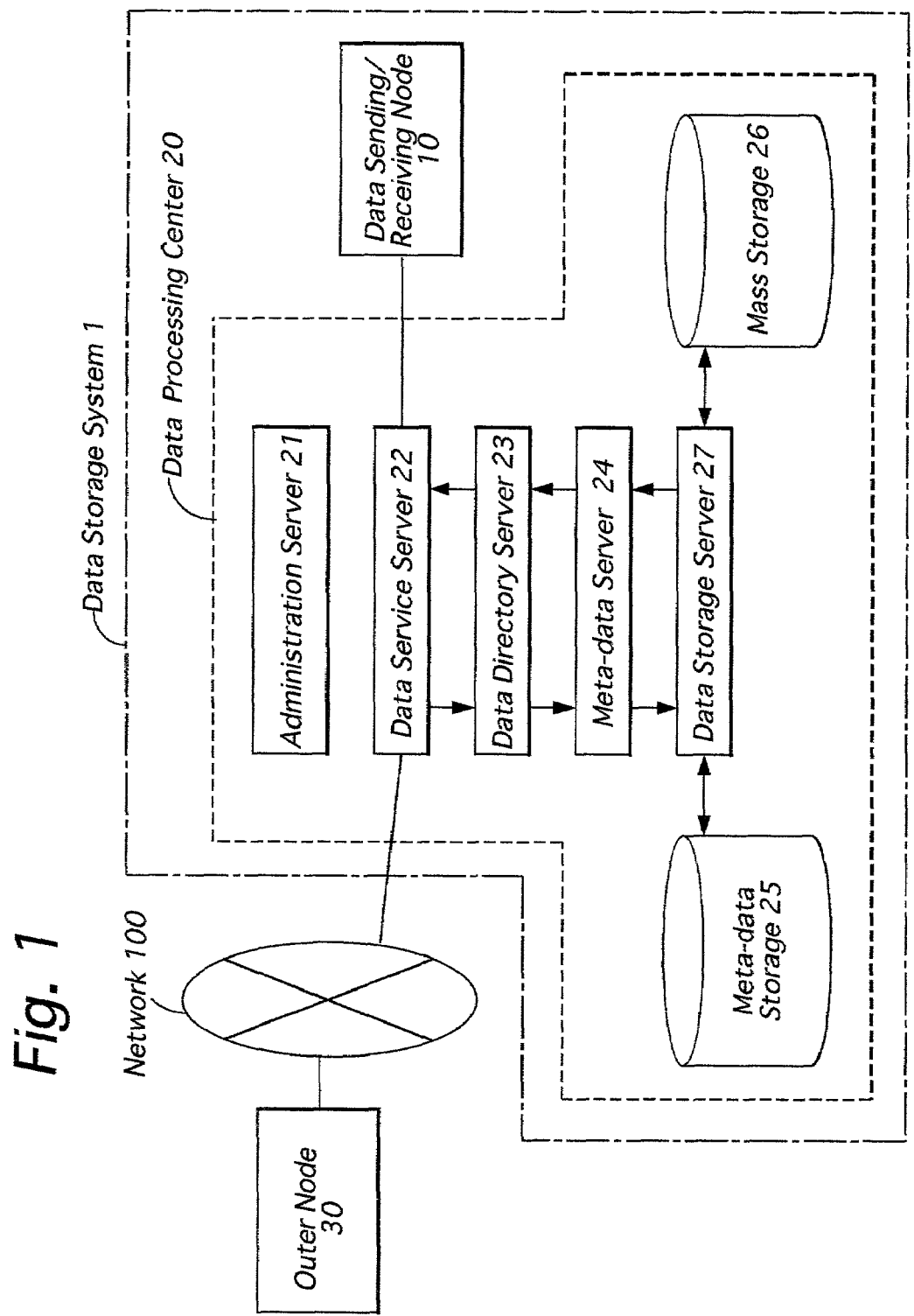
FIG. 1 is a schematic view showing a construction of the data storage system according to the present invention.

The detail of the preferred embodiments of the present invention will be explained below, referring to the attached drawings.

FIG. 1 is a block diagram showing a basic construction of the data storage system according to the present invention. As shown in FIG. 1, the data storage system 1 of the present invention comprises a data sending/receiving node 10, which is a company attending to, for instance, EDI, and a data processing center 20, which works to relay data transferred/received from/by the data sending/receiving node 10.

The data processing center 20 is located between the data sending/receiving node 10 and a network 100, so that all data transferred/received from/by the node 10 via the network is relayed by the data processing center 20. To the network 100, is connected another company as an outer node 30 in FIG. 1, which also attends to the EDI, and therefore data is exchanged between the outer node 30 and the data sending/receiving node 10.

It should be noted that the term "node" in this application means a device having a data exchanging function, or a data transferring function, etc., and therefore the term "node" includes an information processing terminal or a server computer. In order to make the explanation easier, only one data sending/receiving node 10 and only one outer node 30 are mentioned in the embodiments, however, a plurality of data sending/receiving nodes 10 may be connected to the data processing center 20 and a plurality of outer nodes may be connected to the network 100. The network 100 means an internet, a WAN or a LAN.

The data processing center 20 is a device having a data conversion function, a data exchanging function, a data transmitting function, a network managing function, etc., and comprises an administration server 21, a data service server 22, a data directory server 23, a meta-data server 24, a meta-data storage 25, a mass storage 26 and a data storage server 27.

The administration server 21 has a function for managing the data processing center 20 itself; the data service server 22 has a function to receiving data sent from the data sending/receiving node 10 and sending the processed data to a destination node. The data directory server 23 is for managing peripheral information of data, for instance, where meta-data should be registered in the meta-data storage, where data sent from the data sending/receiving node 10 should be stored, and information about an owner of meta-data stored in the meta-data storage, etc.

The meta-data server 24 has a function for managing attribute information of data, such as the data format of a destination of data, a relation between data which is necessary to be recorded in the data processing center 20 and data to be sent/received by the data sending/receiving node 10. The meta-data storage 25 is a disk for registering and storing the processes conducted in the data processing center 20 as meta-data. The mass-storage 26 is a disk for storing data other than meta-data dealt in the data sending/receiving node 10. The data storage server 27 is for managing physical addresses of data stored in the meta-data storage 25 and the mass storage 26, and a capacity of each storage, etc.

(1) Data Conversion (First Embodiment)

In the first embodiment, the process will be explained for that data sent from the data sending/receiving node 10 which is converted into a data format used in a data destination. More concretely, when the data sending/receiving node 10 of the date storage system of the present invention sends a debit note to the outer node 30 via the network 100, the data processing center 20 converts the data sent from the node 10 in a data format used in the node 10 into the data format used in the destination node (the outer node 30) and then sends the data to the node 30.

First, the data sending/receiving node 10 has defined processes for converting the data format of the debit note into a data format used in the destination node (the outer node 30) in a form of meta-data, and previously sends the meta-data in order to register them in the data processing center 20. The meta-data is, more concretely, registration information, as shown in FIG. 2(*a*), including a name "debit note conversion", a command "register" and meta-data body "meta-data defining processes for converting data format". The data sending/receiving node 10 sends the meta-data to the data service server 22 of the data process center 20. It should be noted that the meta-data body describes the processes for converting the debit note written in a data format used in the data sending/receiving node 10 into the debit note in a data format used in the outer node 30 as shown in FIG. 2(*b*).

Since the meta-data includes a command "register", the data processing center 20 gives a name "debit note conversion" to the meta-data body and register it in the meta-data storage 25. While, the meta data server 24 extracts attribute information, such as "which information should be taken and from where it takes the information" and to "where the processed result should be sent", and stores them in a memory provided in the meta-data server itself. Then, the data processing center 20 notices the registered name of the meta-data body and the fact that the meta-data defining the processes for "debit note conversion" has been normally done to the data sending/receiving node 10 to complete the registration of the meta-data for the processes "debit note format conversion".

Next, the process for actually sending debit note data from the data sending/receiving node 10 to the outer node 30 will be explained. First, the data sending/receiving node 10 sends request information to the data service server 22, which includes a name of the meta-data "debit note format conversion", a command "enter", a destination "outer node 30", and sending data "debit note data for outer node 30". In reply to the request, the data service server 22 notices the request information to the directory server 23 except for the destination "outer node 30". The data directory server 23 sought out the meta-data "debit note conversion" stored in the meta-data storage 25 based on the request information, and then instructs to the meta-data server 24 to read out the meta-data "debit note conversion".

While the meta-data server 24 instructs the data storage server 27 to read the meta-data out, the meta-data server 24 takes out the attribute information about the meta-data "debit note format conversion", which is managed in the meta-data server 24 itself. When the meta-data server 24 has completed to read out the meta-data body of the data "debit note conversion", the meta-data server 24 converts the data format of the data "debit note data for outer node 30", which is included in the request information received from the data service server 22, in accordance with the processes defined by the meta-data "debit note format conversion".

Then, the data storage server 27 notices the conversion result (FIG. 2(*c*)) of the data format conducted in accordance with the meta-data "debit note data format conversion" to the meta-data server 24. The meta-data server 24 notices the result to the data service server 22 via the data directory server 22 in addition to the attribute information managed in the meta-data server 24 itself. The data service server 22 sends the debit note data, whose data format has been converted into a format used in the outer node 30, to the outer node 30 in accordance with the destination information "outer node 30" included in the request information from the data sending/receiving node 10.

As explained in detail above, according to the data storage system of the present invention, since the process for converting a data format is registered in the data process center as meta-data, the data sending/receiving node 10 can obtain a data format converting service just by designating the meta data. That is to say, the data sending/receiving node 10 can send data to the outer node without processing the data at the data sending/receiving node 10 side, and therefore the data processing amount conducted in the node 10 can be reduced. Further, once the process for converting the data format is registered in the data processing center 20, when the node 10 sends data to another node, which uses the same data format as that in the outer node 30, the process registered in the data processing center 20 can generally be used.

In the above-mentioned first embodiment, in the case that data is sent from a data sending/receiving node 10 to the outer node 30 is explained, however, the same construction can be applied to the case that data is sent from the outer node 30 to the data sending/receiving node 10, or in the case that data is sent between two data sending/receiving nodes both belonging to the data storage system 1.

(2) Data Automatic Recording (Second Embodiment)

The second embodiment of the present invention will be explained below, where the data sent from the data sending/receiving node 10 via the data registration center 20 is automatically recorded in the center 20. That is to say, in the second embodiment, all the data sent/received between the data sending/receiving node 10 and the outer node 30 is automatically backed up in the data processing center 20. It should be noted that in the embodiments mentioned below the data processing center 20 has the same construction as that in FIG. 1 and therefore the explanation for the construction will be omitted.

In the second embodiment, such a situation is assumed that the outer node 30 opens a site for selling products on the network 100, and the data sending/receiving node 10 purchases the product via the network 100; the image information for purchasing the product is automatically recorded in the data processing center 20.

First, the data sending/receiving node 10 asks to register meta-data defining processes for automatically backing up the data sent to the data processing center 20 from the node 10. More concretely, the meta data is request information including a name "data automatic record", a command "register", meta-data body "meta-data defining process for automatically registering data sent from the node 10". The data transmitting/receiving node 10 sends the request information for requesting a registration of the meta-data to the data service server 22 in the data processing center 20.

Since the information includes a command "register", the data processing center 20 gives a name "data automatic register" to the meta-data body and registers it in the meta-data storage 25; then the center 20 notices the name of the meta-data "data automatic record" and the fact that the registering has caused to the data transmitting/receiving node 10 in order to complete the registration of the meta-data defining the process for data automatic recording. All data, then, sent from the data transmitting/receiving node 10 to the network 100 via the data process center 20 is automatically recorded in the data processing center 20 in accordance with the process defined in the meta-data.

Next, it will be explained that the purchasing data is automatically recorded when the data transmitting/receiving node 10 actually buys the product offered on the site of the outer node 30 via the network 100 after completing the registration of the meta data.

First, the data transmitting/receiving node 10 accesses the site of the outer node 30 where the products are sold via the network 100 to take in a product purchasing image on the display of the data transmitting/receiving node 10. By filling in the blanks for name and address of purchaser, etc. on the image and clicking a purchase button there, the purchasing data on the image on the display of the node 10 is sent to the outer node 30 via the data processing center 20.

When receiving the purchasing data from the data transmitting/receiving node 10, the data processing center 20 automatically calls up the meta-data "data automatic record", which has been registered in the meta-data storage 25, and automatically stores the purchasing data in the mass storage 26 in accordance with the processes defined by the meta-data. That is to say, all data sent from the data transmitting/receiving node 10 to the network 100 via the data processing center 20 is automatically recorded in the mass storage 26. More concretely, the data service server 22 receives the "purchasing data" sent from the data transmitting/receiving node 10 and stores the data in the mass storage via the data directory server 23 and the data storage server 27. It should be noted that the data directory server 23 records the place where the "purchasing data" is stored, and when the data was stored and manages these records.

In the second embodiment, since the data processing center 20 automatically records and manages the data sent from the data transmitting/receiving node 10, it is not necessary for the data transmitting/receiving node 10 to send any request information to the data processing center 20. That is to say, when the product selling site is taken in by the node 10 and displayed on its screen and the purchasing button is clicked, the purchasing data is sent to the outer node 30. Therefore, the data center 20 automatically records and manages the image data.

In the present embodiment, the case where all data sent from the data transmitting/receiving node 10 to the outer node 30 is automatically recorded, has been explained, however, it is possible to arrange that some kind of data is automatically recorded in a limited manner. For instance, only the debit note data explained in the first embodiment is automatically recorded out of the data sent from the data transmitting/receiving node 10. In this case, the processes for automatically recording only the debit note data should be previously registered in the center 20 as meta-data, and the center 20 judges if the data sent from the node 10 is "debit note data", and records relevant data only in the center. In this case, it is possible to further arrange the system in such a manner that the data is not sent to the destination right away but stored in the mass storage 26 for a predetermined term; or that the destination node is set in the data processing center 20 and when some amount of the debit note data is stored, for instance, at the end of month, the data is sent to the destination node in a summed manner.

In the above-mentioned second embodiment, in the case that data sent from the data sending/receiving node 10 to the outer node 30 is automatically recorded is explained, however, the same construction can be applied to record the data sent/received between two or more data sending/receiving nodes both belonging to the data storage system 1.

(3) Virus Check (Third Embodiment)

The third embodiment, where a data virus check is conducted, will be explained. That is to say, a check to see if a virus program is contained in data, which is received by the data transmitting/receiving node 10, is conducted in the data process center 20.

In the third embodiment, the data transmitting/receiving node 10 carries out a registration of meta-data, which define the process for a virus check. More concretely, the data transmitting/receiving node 10 sends a request information including a name such as "virus check", a command "register", a meta-data body "meta-data defining the virus checking process" to the data service server 22 of the data process center 20. It should be noted that the meta-data body "meta-data defining the virus checking process", as shown in FIG. 4, is data mentioning information identifying an electronic mail to which the virus checking should be applied and a name of a virus checking software. That is to say, the data process center 20 has previously owned a vaccine program for conducting the virus check; and the data transmitting/receiving node 10 designates the vaccine program and an electronic mail to be checked by the program as meta-data to obtain the virus checking service in the data processing center.

Since the request information includes a command "register", the data process center 20 gives a name "virus check" to the meta data body and stores the meta-data body in the meta-data storage 25. The data process center 20 then informs the name of the meta-data and the fact that the meta-data body "virus check" has finished normally to the data transmitting/receiving node 10 to complete the registration of the meta-data defining the process for the virus checking.

Then, the process of the virus checking when the data transmitting/receiving node 10 receives an electronic mail from the outer node 30 after the meta-data registration mentioned-above will be explained. The outer node 30 sends an e-mail to the data transmitting/receiving node 10 through an electric mail software; when the data transmitting/receiving node 10 receives the e-mail from the outer node 30, the node 10 sends request information including the meta-data name "virus check" and the command "enter" to the data service server 22 to ask for a virus check. In reply to the request, the data service server 22 passes the request information to the meta-data server 24 via the data directory server 23.

The meta-data server 24 instructs the data storage server to read out the meta-data body "virus check" from the meta-data storage 25. After the reading out the meta-data body "virus check" from the data storage server 27, the data service server 22 judges the destination of the e-mail defined in the meta-data (in this case, an e-mail address of the data transmitting/receiving node 10), and enters a virus check for the e-mail with a vaccine program. After the check, the data process center 20 checks if the virus check has finished normally and if any virus program is included in the subject e-mail to the data transmitting/receiving node 10.

In this manner, according to the data storage system of the present embodiment, the data transmitting/receiving node 10 sends a virus check request to the data process center 20 and the virus check is conducted by the data process center 2. Therefore, the data transmitting/receiving node 10 no longer needs to own a virus check program itself.

(3) Data Back Up (Fourth Embodiment)

The fourth embodiment of the present invention will be explained, where data dealt in the data transmitting/receiving node 10 is backed up in the data process center 20. In this embodiment, the term "back up" means a process that the data process center 20 backs up the data stored in the memory of each data transmitting/receiving node 10.

First, the data process center 20 registers meta-data defining the process for data back up in accordance with a request from the data transmitting/receiving node 10. More concretely, the data transmitting/receiving node 10 sends a request information to register the meta data to the data service server 22 of the data process center 20. The request information includes a name "back-up", a command "register", a meta-data body "meta-data defining processes for back up". It should be noted that the meta-data body has information about the address and the password of the data transmitting/receiving node, and the name of the file to be backed up.

Since the request information includes a command "register", the data process center 20 gives the name "back up" to the meta-data body and registers the body in the meta-data storage 25. Then, the data service server 22 sends a notice to the node 10 that the meta-data "back up" has been normally registered to complete the process for registration of the meta-data.

The back up process will be explained, which is conducted by the data process center 20 in accordance with a request from the data transmitting/receiving node 10 after the registration of the meta-data. First, the data transmitting/receiving node 10 sends a request information including the name of the meta-data "back up" and a command "enter" to the data service server 22. In reply to the request, the data service server 22 passes the request information to the meta data server 24 via the data directory server 23.

The meta data server 24 instructs the data storage server 27 to read out the meta-data body "back up" from the meta data storage 25. After reading out the meta-data body "back up", the data service server 22 judges the address of the data transmitting/receiving node mentioned in the meta-data body, and reads out the file in the pass mentioned in the meta-data, and stores the data in the mass storage 26 with the designated name of the file. After storing of the data, the data process center 20 confirms the fact that the back up for the file has been normally finished to the data transmitting/receiving node 10.

In this manner, according to the data storage system of the fourth embodiment, it becomes possible to back up the data owned by the data transmitting/receiving node(s) 10 in the data process center 20 and to totally manage the back up data there. Further, in such a case that the node 10 has lost some data, it is very easy to recover the data because all data in the node 10 is backed up in the data process center 20, so that it becomes possible to prevent the loss of data. Moreover, in a case that the computer systems used in the node 10 is changed, it becomes possible to transfer smoothly the data into the new system.

Next, how to charge for the services offered by the data process center 20 will be explained. The charge for the services offered by the data process center 20 is paid by the data transmitting/receiving node 10 which takes the service. It is considered to charge to the node 10 in such a manner that how many times the data transmitting/receiving node 10 uses the service is memorized in the data process center 20, and the service fee is calculated in accordance with the number of times that the data transmitting/receiving node 10 used. In this case, the node 10 pays the service fee in accordance with the number of times without regard to the content of the services executed by the data process center 20.

In addition, it may be possible to calculate the service fee in accordance with what kind of services the data transmitting/receiving node 10 used. In this case, the data process center 20 memorizes the kind of service that the node 10 used. It may also be possible to combine the charges, i.e. the charge in accordance with the number of times that the node 10 used the service and then charge in accordance with the type of service.

Another possibility is that the data process center 20 memorizes amount of computer resource in the data process center the data transmitting/receiving node 10 used, and calculates the charge in accordance with the amount. In this case, the amount of computer resource is determined depending on the processing time of the central processing unit of the data process center 20 or the capacity of the storage provided in the center 20, which the data transmitting/receiving node 10 used. It is also possible to charge by combining the amount of computer resource, and the number of times that the node 10 used the service, and by the type of services offered by the center 20.

The data storage system according to the present invention is not limited to the above-mentioned embodiment, and many modifications can be applied. For instance, the data process center 20 may has a function to prevent irregular accesses to the data transmitting/receiving nodes 10 from outside, and may has a function to split the load of data communication lines so that the lines connecting the data process center 10 and the data transmitting/receiving nodes 10 are properly used in accordance with the business conducted in the node 10.

Further, the data process center 20 may have a function to prevent the leakage of data sent/received from/by the data transmitting/receiving node 10, a function to guarantee the property of data sent from the data transmitting/receiving node 10, a function to destroy unnecessary data included in data sent/received from/by the data transmitting/receiving node 10, a function to obtain a communication log of data sent/received from/by the data transmitting/receiving node 10, and the center 20 may conduct these functions in accordance with a request from the data transmitting/receiving node 10.

As explained above, according to the present invention, meta-data, which define necessary data processes are previously registered in the data process center, so that the data transmitting/receiving node can authorize the work, such as a data format conversion, recording and/or managing data sent/received, a virus checking, a data back up, etc. to the data process center just by designating the meta-data corresponding to the work. Therefore, it is not necessary to conduct the complicated processes in the data transmitting/receiving node itself and no special installation for these processes is required in the data transmitting/receiving node, so that the cost for storing data or processing data can largely be reduced.

What is claimed is:

1. A data storage system comprising at least one data sending/receiving node and a relay node being provided between said data sending/receiving node and a network, which is for relaying data between said data sending/receiving node and said network, comprising:

a meta-data registering means for registering data processes which should be conducted in said relay node as meta-data, and a data processing means for conducting data process in accordance with the processes defined by the meta-data registered in said meta-data registering means;

wherein meta-data designated by said data registering means, and data sent from said data sending/receiving node or data received by said data sending/receiving node are processed in accordance with the processes defined by the selected meta-data, wherein meta-data, which define processes for conducting a virus check about data received by said data sending/receiving node, are registered in said meta-data registering means, and wherein data received by said data sending/receiving node is subjected to a virus check in accordance with the processes defined by the meta-data for virus checking in said relay node.

2. A data storage system comprising at least one data sending/receiving node and a relay node being provided between said data sending/receiving node and a network, which is for relaying data between said data sending/receiving node and said network, comprising:

a meta-data registering means for registering data processes which should be conducted in said relay node as meta-data, and a data processing means for conducting data process in accordance with the processes defined by the meta-data registered in said meta-data registering means:

wherein meta-data designated by said data registering means, and data sent from said data sending/receiving node or data received by said data sending/receiving node are processed in accordance with the processes defined by the selected meta-data.

wherein meta-data, which define processes for backing up about data dealt in said data sending/receiving node, are registered in said meta-data registering means, and wherein data dealt in said data sending/receiving node are backed up in accordance with the processes defined by the meta-data for backing up in said relay node.

3. A data storage system comprising at least one data sending/receiving node and a relay node being provided between said data sending/receiving node and a network which is for relaying data between said data sending/receiving node and said network comprising:

a meta-data registering means for registering data processes which should be conducted in said relay node as meta-data, and a data processing means for conducting data process in accordance with the processes defined by the meta-data registered in said meta-data registering means;

wherein meta-data designated by said data registering means, and data sent from said data sending/receiving node or data received by said data sending/receiving node are processed in accordance with the processes defined by the selected meta-data, wherein said relay node further comprises a function for preventing irregular access to said data sending/receiving node, and/or, a function to split the load of communication lines between said relay node and said data sending/receiving node.

4. A data storage system according to claim 3, wherein said relay node further comprises a function for preventing data leakage of data sent/received from/by said data sending/receiving node, a function for deleting unnecessary data included in data sent/received from/by said data sending/receiving node, and a function for obtaining a communication log of data sent/received from/by said data sending/receiving node, and wherein said relay node carries out one or more of the functions in accordance with a request from said data sending/receiving node.

* * * * *